(12) United States Patent
Venugopal et al.

(10) Patent No.: US 11,503,081 B1
(45) Date of Patent: Nov. 15, 2022

(54) LOAD-DEPENDENT ENCRYPTION MECHANISM SELECTION IN AN ELASTIC COMPUTING SYSTEM

(71) Applicant: Amazon Technologies, Inc., Seattle, WA (US)

(72) Inventors: Sriram Venugopal, Issaquah, WA (US); Gary Michael Herndon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 16/786,868

(22) Filed: Feb. 10, 2020

(51) Int. Cl.
*H04L 29/06* (2006.01)
*G06F 3/06* (2006.01)
*G06F 9/50* (2006.01)
*H04L 9/40* (2022.01)

(52) U.S. Cl.
CPC ............ *H04L 63/205* (2013.01); *G06F 3/067* (2013.01); *G06F 3/0623* (2013.01); *G06F 3/0664* (2013.01); *G06F 9/5077* (2013.01); *H04L 63/0435* (2013.01)

(58) Field of Classification Search
CPC ... H04L 63/205; H04L 63/0435; H04L 63/20; H04L 29/06; G06F 3/0623; G06F 3/0664; G06F 3/067; G06F 9/5077; G06F 3/06; G06F 9/50; G06F 9/5011; G06F 9/5016; G06F 9/5027
See application file for complete search history.

(56) References Cited

U.S. PATENT DOCUMENTS

| 10,154,091 | B1 * | 12/2018 | Flaherty | H04L 67/1097 |
| 2008/0052537 | A1 * | 2/2008 | Nishizono | G06F 21/78 380/42 |
| 2019/0042324 | A1 * | 2/2019 | Chhabra | G06F 12/0808 |

* cited by examiner

*Primary Examiner* — Quazi Farooqui
(74) *Attorney, Agent, or Firm* — Knobbe, Martens, Olson & Bear, LLP

(57) ABSTRACT

Systems and methods are described for implementing load-dependent encryption mechanism selection in an elastic computing system. The elastic computing system can include a set of host devices configured to implement block storage volumes on behalf of users. Users may desire that such volumes be encrypted prior to storing data. It may be generally preferable for encryption to occur on the same host devices that host the volume, to reduce latency and bandwidth usage needed to encrypt the data. However, encryption of data can utilize significant computational resources, which may not be available on host devices that also have sufficient storage resources to host the volume. The present disclosure describes systems and methods that can account for computational resource availability on host devices, selecting "in-place" encryption only when available resources exist on host devices, and otherwise implementing remote encryption of volume data.

21 Claims, 7 Drawing Sheets

LOAD-DEPENDENT ENCRYPTION MECHANISM SELECTION IN AN ELASTIC COMPUTING SYSTEM

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively infrastructure of on-premises computing environments, requires a system architecture that can reliably re-allocate its hardware according to the changing needs of its user base.

DETAILED DESCRIPTION

Figure 1A:
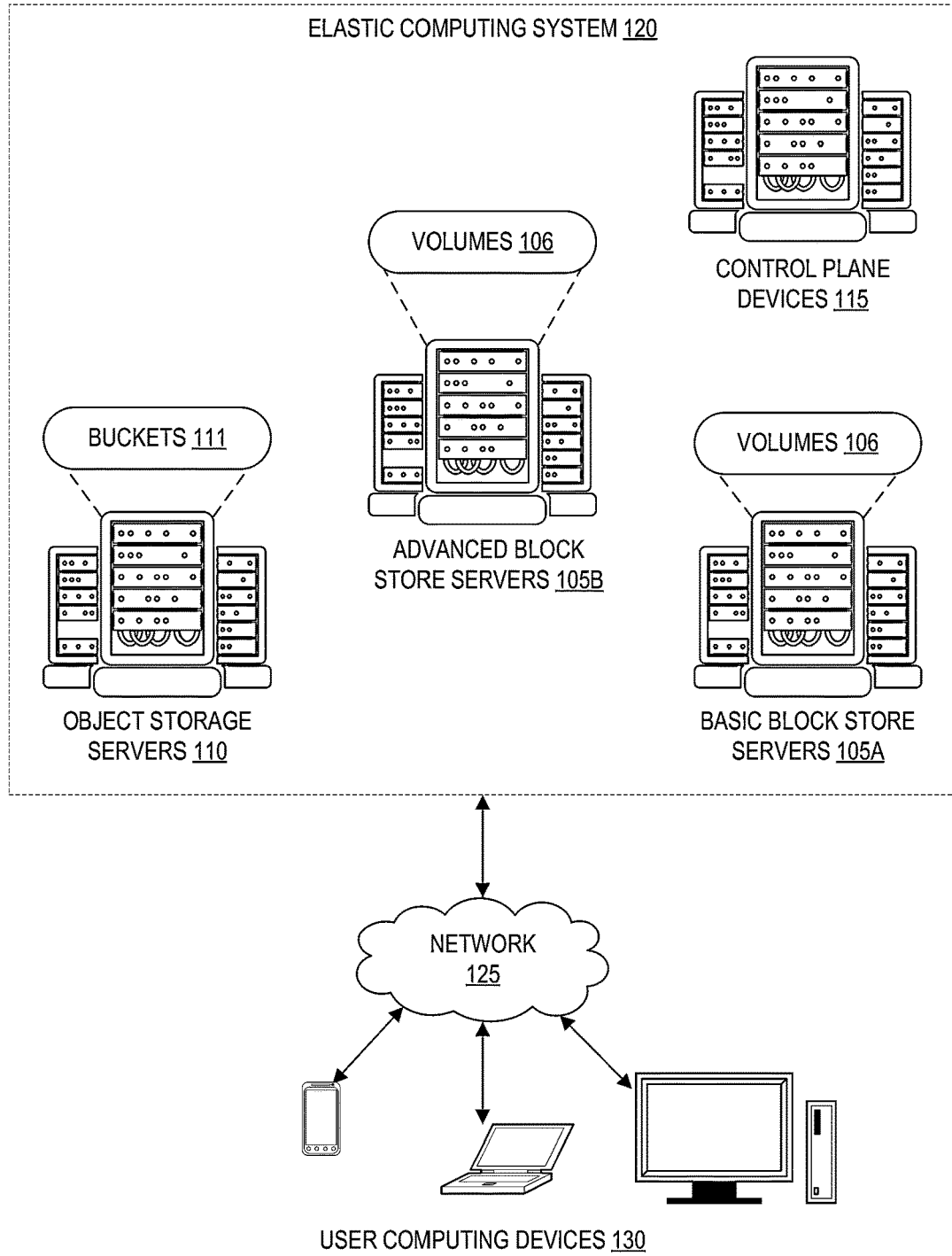
FIG. 1A depicts a schematic diagram of an elastic computing system in which various embodiments according to the present disclosure can be implemented.

Generally described, aspects of the present disclosure relate to the creation and management of encrypted network-accessible block storage devices hosted by a distributed computing system, such as a cloud provider network. A distributed computing system, as described herein, may generally enable users to create, manage, and interact with network-accessible block storage devices, which may be implemented as virtualized devices hosted by underlying computing resources of the distributed computing system. A user may thus acquire and utilize a block storage device without being required, for example, to manage, maintain, provision, etc. any physical device. Often, it is desirable for legal, confidentiality, or privacy purposes that data on a block storage device be encrypted in a secure manner. However, maintaining security of encrypted data can present difficulties. For example, it may be considered a security best practice for encryption of data within a block storage device to occur within an environment that is isolated from user input/output (I/O) to the block storage device. This may prevent unauthorized access to unencrypted data, even if I/O to the device is otherwise compromised. Another difficulty in providing secure encrypted block storage devices is that writing encrypted data to a device typically requires significantly more computational resources than writing unencrypted data. Often, host devices may be optimized to provide abundant storage resources, a metric that can typically scale independently of computational resources. Thus, a host device that has sufficient storage resources to support a block store may not have the computational resources required to support encrypted rights to the block storage, or vice versa.

Embodiments of the present disclosure address the problems noted above by providing for dynamic selection and utilization of a particular one of a variety of encryption mechanisms, selected based on load of the distributed computing system with respect to both storage and computational resources metrics. A block storage service of a cloud provider network can have many mechanisms available for encryption of volume data, including using isolated hardware "on box" (e.g., physically connected to the server hosting the volume data) to support encryption, using isolated hardware of another server (e.g., another server that is dedicated to performing encryption for volumes), or using non-isolated hardware of another server. Some mechanisms may be more preferred than others 13 for example, on box encryption can reduce latency and overall bandwidth usage relative to other mechanisms. However, on box resources are also more limited. The present disclosure describes techniques to take resource usage into account when selecting an encryption mechanism for a volume, selecting the most desirable mechanism given the current resource use of the fleet.

Specifically, as disclosed herein, a control plane of a cloud provider network may obtain a request from a user to create a block storage device (or "block store") within a block storage service, and may determine a candidate set of host devices with sufficiently available storage to support hosting of that device. In this context, available storage may refer to storage quantity (e.g., in terms of available bytes), storage performance metrics (e.g., support I/O operations per second, or "IOPS," seek times, sustained or burst bandwidth, etc.), or a combination thereof. After determining a candidate set of host devices, the control plane may identify an encryption mechanism for populating the data to the block storage device, based at least partly on computational resource availability on host devices within the candidate set.

In one embodiment, the control plane is configured to implement a hierarchy of block data encryption mechanisms, ordered based on desirability of the mechanism. For example, at least some host devices of the block storage service may be configured with isolated resources that may support encryption of data written to a hosted block store, while being logically and/or physically isolated from user I/O to the block store. As used herein, the term isolation refers to a configuration that inhibits or restricts sets of computing resources, which may share a common physical structure, from being able to directly communicate with each other. For example, isolation may prevent programs executing within one isolated environment from accessing information about programs executing in another isolated environment. Logical isolation can apply to sets of physical devices and/or virtualized computing resources. Examples of logical isolation include, by way of non-limiting example, use of isolated hardware (e.g., different processors, memory, etc.), use of a virtual computing device or machine instance isolated from user I/O, or use of a software container isolated from user I/O. Use of isolated resources may generally be most desirable within the hierarchy (e.g., assuming that such use does not overburden the hardware, which may also be utilized for other processing). Furthermore, it may be possible to support creation of an encrypted block store using isolated resources of a host device other than a device that actually hosts the block store. For example, a first host device may utilize isolated resources to encrypt data, and then may write that encrypted data to a block store hosted by a second host device. Thus, computational resources of one host device may be used in conjunction with storage resources of another host device, decoupling constraints on these resources. However, use of isolated resources on a different host device than supports hosting of the block store may be less desirable than use of isolated resources on the same host device that hosts the block store, as use of hardware on a different host device can be expected to result in increased network communications on the elastic compute system relative to use of isolated resources on the same host device. Still further, even where isolated resources is not available to support encryption of data written to a volume, the elastic compute system may provide secure encryption by causing a first host device to utilize non-isolated resources (e.g., hardware that supports user I/O) to encrypt data written to a block store hosted by a second host device. While this solution may be less desirable than utilization of isolated resources, it may still provide acceptable security, as it can separate steady-state storage of data from the information required to decrypt that data, thus minimizing security risk even when user I/O may be malicious.

In accordance with embodiments of the present disclosure, after selection of a candidate set of host devices, a placement service of an elastic compute system may select an encryption mechanism based on the configured hierarchy of desirability (e.g., on-host use of isolated resources, off-host use of isolated resources, off-host use of non-isolated resources) and an availability of compute resources among host devices. If a host device from the candidate set has sufficient isolated resources to support encryption, the placement service may select that host device to host the block store, which host device is generally referred to herein as a "target" server. Where no host device within the candidate set has available isolated resources to support encryption, the placement service may nevertheless select a target server from the candidate set on which to host the block store, but may also select another host device to support encryption of data written to the block store, which device is generally referred to herein as a "encryption server." For example, the placement service may first attempt to locate a host outside of the candidate set with available isolated resources to support encryption, and if located, select that host as the encryption server. Should no host be located with such available isolated resources, the placement service may locate a host with available non-isolated resources to support encryption and may select that host as the encryption server. The placement service may cause a workflow to be implemented on the elastic compute system, such that the target server creates a block storage device according to the user's requirements, and populates that block storage device with data provided by the encryption server. The encryption server, in turn, may be configured to obtain data from a data source (which may be unencrypted or encrypted according to a different encryption than desired on the block storage device), encrypt the data according to the encryption desired on the block storage device (including decrypting the data first, if required), and provide the encrypted data to the target server. In one configuration, a target server "pulls" data from the encryption server by requesting data from the encryption server. However, "push" configurations, in which the encryption server initiates writing of data to the target server, are also possible. Similarly, the encryption server may pull data from a data source, or accept "pushes" of data from that source.

The elastic compute system may support a number of data sources from which block storage devices can be populated. For example, the elastic compute system may enable creation of an encrypted block store from another block store, "cloning" that other block store while encrypting or re-encrypting the data of the other block store. In another example, the elastic compute system may enable creation of a block store from a device "image" or "snapshot," where such image or snapshot refers to a static record of blocks within a block storage device at a given point in time, which record may not itself support block-level operations. For example, such a record may be stored as a file on another block storage device, or as an object on an object storage system (e.g., a system in which interactions occur at the level of individual objects or varying size, rather than fixed-size blocks). Thus, the encryption mechanisms discussed herein may generally obtain data from a data source, encrypt that data, and write that data to a corresponding position of a block store. Particularly when implemented on creation of a block store, this process is sometimes referred to as "hydrating" the block store from the data set.

As discussed above, it is often desirable to isolate encryption operations from user I/O, to prevent potential compromise of the encryption process due to malicious user I/O. For that reason, the encryption mechanisms provided herein are in some embodiments applied only to hydration of a block store from a data set, as opposed to being applied during block-level I/O with the block store. Generally, encryption during block-level I/O may be completed by a device requesting to write to the block store (as the ability to read that data would then be limited to the device writing the data, or other devices to which encryption information is shared).

In some configurations, isolated resources used for encryption may also support other, non-user-I/O operations. For example, such resources may also support "control plane" operations on host devices (e.g., operations that alter configuration of the host devices, as opposed to data written to or from block stores). As another example, even when not directly supporting user I/O, isolated resources used to encrypt data during hydration of a block store may nevertheless indirectly support I/O. Illustratively, a block store may provide for handling of "get faults" during hydration, which can occur when a user attempts to read data that exists within a data source, but is not yet populated to the block store. In that situation, the block store may be configured to attempt to obtain and populate that data "out of order" from a typical hydration process, thus applying computational load to resources used to encrypt data during hydration. Given these potentially time-sensitive operations, it may be desirable to not fully utilize resources of isolated resources to support encryption during normal hydration of a block store. Similarly, where non-isolated resources is used to support encryption during hydration, it may be desirable not to fully utilize those resources to support that encryption, as those resources may also support other operations (e.g., user I/O to volumes hosted on the host device including the resources).

Accordingly, in embodiments of the present disclosure, an elastic compute system may select an encryption mechanism based on computational load of host devices within a fleet of devices, while ensuring that utilization of computational resources does not exceed a threshold level. In this manner, the elastic compute system can attempt to efficiently utilize computing resources while not inhibiting other operations of the system. Moreover, because an encryption mechanism can be selected in a manner that separates computational load requirements from storage resource requirements, overall efficiency of resource usage within the system can be increased while maintaining security of encryption processes on the system.

As would be appreciated by one of skill in the art, embodiments of the present disclosure—including selection of an encryption mechanism based on computational load of a fleet and in a manner that decouples computational and storage resource loads—represent an improvement in computer-related technology, and more particularly, an improvement in hosted network-accessible block storage devices. Moreover, embodiments of the present disclosure address technical problems, such as the limited computational and storage resources of host devices, and the difficulty of providing secure encryption that is resistant to malicious user I/O. These technical problems are addressed by the technical solutions provided herein, including a placement service that identifies a target server and encryption server (which may in some cases represent the same host device) based on storage and computational load of the elastic storage system, while implementing a hierarchy of potential encryption mechanisms to minimize network traffic within the system and to maintain operational readiness to support other operations. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, although the techniques are described with respect to encryption of unencrypted data, they can also be used for re-encryption where the type of encryption changes between the source data and the encrypted data. Further, although techniques are described below with respect to creating encrypted volumes from specific data sources, such as unencrypted snapshots, the described techniques can similarly create encrypted volumes from other data sources, such as unencrypted volumes. The techniques described herein may also be used to create encrypted snapshots from other snapshots or volumes. In addition, although described in the context of an elastic computing system, the disclosed techniques can be implemented in other suitable data-hosting networked computing environments.

Overview of Example Computing Environment with Tertiary Replica

FIG. 1A depicts an example computing environment 100 including an elastic computing system 120 in which the disclosed techniques can be implemented. The elastic computing system 120 can be accessed by user devices 130 over a network 125. Although this example is framed in the context of a computing system that can elastically assign and release resources, it will be appreciated that the disclosed techniques may be implemented in some embodiments in non-elastic computing systems. The elastic computing system 120 includes one or more object storage servers 110, one or more block store servers 105 (including both basic block store servers 105A and advanced block store servers 105B), and one or more control plane devices 115 that are in networked communication with one another and with the network 125 to provide users with on-demand access to computing resources including volumes 106 and buckets 111, among others. These particular resources are described in further detail below. Some implementations of elastic computing system 120 can additionally include compute servers providing computing resources (referred to as "virtual machines" or "instances"), domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The elastic computing system 120 can be a cloud provider network in some implementations. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The elastic computing system 120 can provide on-demand, scalable computing platforms to users through the network 125, for example allowing users to have at their disposal scalable "virtual computing devices" that may access object storage servers 110 and block store servers 105. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The elastic computing system 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The elastic computing system 120 can communicate over network 125 with user devices 130. The network 125 can include any appropriate network, including an intranet, the Internet, a cellular network, a local area network or any other such network or combination thereof. In the illustrated embodiment, the network 125 is the Internet. Protocols and components for communicating via the Internet or any of the other aforementioned types of communication networks are known to those skilled in the art of computer communications and thus, need not be described in more detail herein.

User computing devices 130 can include any network-equipped computing device, for example desktop computers, laptops, smartphones, tablets, e-readers, gaming consoles, and the like. Users can access the elastic computing system 120 via their computing devices 130, over the network 125, to view or manage their data and computing resources, as well as to use websites and/or applications hosted by the elastic computing system 120.

Turning specifically to the roles of the different servers within the elastic computing system 120, the block store servers 105 provide persistent data storage in the form of volumes 106, each of which represents a virtualized, network-accessible block-storage device (e.g., a virtual "hard disk"). The block store servers 105 and associated control plane functionality can provide an elastic block store service of the cloud provider network. Block storage services can be referred to as a cloud disk service, managed disk service, storage area network service, persistent disk service, or block volume service, in various implementations. The block storage service may additionally be referred to herein as a "block storage system." Data of volumes 106 may be encrypted or unencrypted. In one embodiment, data of a volume 106 is encrypted during hydration from a data source, in accordance with embodiments of the present disclosure. The block store servers 105 include one or more host computing devices on which data is stored as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context.

User volumes 106, which can be treated as an individual "hard drives" ranging for example from 1 GB to 1 terabyte TB in size, are made of one or more blocks stored on the block store servers 105. Although treated as an individual hard drive, it will be appreciated that the hardware storing a volume may not actually be a hard drive, but instead may be one or more virtualized block storage devices (or simply "virtualized storage devices") implemented on one or more underlying physical host devices. Volumes 106 may be partitioned a number of times (e.g., up to 16) with each partition hosted by a device of the elastic computing system 120. The block store servers 105 can be configured to mirror the content of block devices between servers 105 and synchronously replicate data across redundant servers. For example, the block store servers 105 can have built-in redundancy for volumes by replicating the volume across multiple servers within an availability zone (e.g., a primary replica and a synchronous secondary replica), which means that volumes will not fail if an individual drive fails or some other single failure occurs. The primary and secondary replicas can support user reads and writes (input/output operations, or "I/O operations"), and thus the block store servers 105 can be accessible to the user computing devices 130 over the network 125.

In accordance with embodiments of the present disclosure, the elastic computing system 120 includes multiple configurations of block store servers 105A, shown in FIG. 1A as basic block store servers 105A and advanced block store servers 105B. In FIG. 1A, the advanced block store servers 105B include physical hardware, such as a processor and potentially memory, that is isolated from user I/O operations on the volumes 106 of those servers 105B. In one embodiment, this physical hardware is an expansion card of each host device, though other configurations (e.g., a second processor on a multi-processor motherboard) are possible. As discussed herein, this isolated physical hardware can be utilized to support encryption of data prior to storage on a volume 106, thus securing the encryption process from malicious user I/O. This isolated physical hardware may also support other operations, such as control plane operations on the servers 105B. In FIG. 1A, basic block store servers 105A lack this isolated physical hardware. The term "basic" in this context is solely to distinguish servers 105 lacking isolated physical hardware from those that include isolated physical hardware, and is not intended to imply that basic block store servers 105A are inferior to advanced block store servers 105B in other respects. In one embodiment, the configuration of basic and advanced block store servers 105 is identical, other than with respect to the isolated hardware discussed above. In another embodiment, the configuration of basic and advanced block store servers 105 may be different. For example, the advanced block store servers 105B may provide more or less computational or storage resources than basic block store servers 105A, or vice versa. In one configuration, either or both the basic and advanced block store servers 105 may implement virtualized block storage devices on underlying physical storage by supporting reads to and writes from a dedicated portion of underlying physical storage, a file on that physical storage, etc. In another configuration, either or both basic and advanced block store servers 105 may utilize support journal-based I/O to virtualized devices, by providing computational resources (e.g., processors) that accept I/O to a write journal, and later persist that I/O to a disk drive shared among multiple computational resources. Implementation of journal-based I/O to virtual devices is discussed in more detail, for example, in U.S. Patent Application Publication No. 2018/0181330 to Kusters et al., published Jun. 28, 2018 (the "'330 Publication"), the entirety of which is incorporated by reference herein. While FIG. 1A depicts advanced block store servers 105B as including isolated hardware, other types of isolated resources may also be utilized in accordance with embodiments of the present disclosure (e.g., an isolated execution environment, such as a virtual machine instance or container).

The object storage servers 110 represent another type of storage within the elastic computing environment 120. The object storage servers 110 and associated control plane functionality can provide object-based storage service of the cloud provider network. Object-based storage services can be referred to as a blob storage service, cloud object storage service, or cloud storage service, in various implementations. The object storage servers 110 include one or more servers on which data is stored as objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, so authorized access to them can be obtained through requests from networked computing devices in any location. Each bucket is associated with a given user account. Users can store as many objects as desired within their buckets, can write, read, and delete objects in their buckets, and can control access to their buckets and the contained objects. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of object storage's vast scalability and metadata characteristics.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data. While the object storage servers 110 can be used independently from the volumes described above, they can also be used to provide data backup as described below with respect to snapshots (e.g., object-stored backups of volume data).

Users can instruct the elastic computing system 120 to create snapshots of their volumes stored on the block store servers 105. When a volume is unencrypted, typically any snapshot of that volume would be unencrypted as well. A snapshot can then be used to create a new volume with information matching the volume captured in the snapshot, for example providing the benefit of feeding the volume data to the new copy without impacting I/O operations at the primary and secondary replicas of the volume. Further, due to the greater redundancy of the object storage servers 110 provided in some embodiments, such snapshots may provide a more resilient backup copy of a volume than additional copies stored on the block store servers 105. Another benefit of using a snapshot to create a new volume copy is that it may provide the ability to replicate the volume across availability zones, while the block store servers 105 may, in one configuration, only support replication within a given availability zone.

In one embodiment, a snapshot is a point-in-time block-level backup of the volume, stored as a copy of data on the volume on one or more of the object storage servers 110 (e.g., as a single object or a collection of objects). However, unlike other data stored on the object storage servers 110, snapshots may in some cases not be accessible within user buckets, and instead are accessible through the application programming interface ("API") of the block store servers 105. In one example, snapshots are implemented as incremental records of data within a volume. Illustratively, when the first snapshot of a volume is taken, all blocks of the volume that contain valid data are copied as one or more objects to the object storage servers 110, and then a snapshot "table of contents" or "manifest" file is written to the object storage servers 110 that includes a record of the one or more objects, as well as the blocks of the volume to which each of the one or more objects correspond. Due to the use of incremental snapshots, when the subsequent snapshots are taken of the same volume, only the blocks that have changed since the first snapshot need by copied to the object storage servers 110, and the table of contents or manifest file can be updated to point to the latest versions of each data block (or a second table of contents or manifest file can be created, enabling the initial table of contents or manifest file to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of computing resource instances to create a "machine image" of that instance stored in the object storage servers 110, and new copies of the instance can be launched from the machine image.

In addition to block storage servers 105 and object storage servers 110, the system 120 is further depicted in FIG. 1A as including one or more control plane devices 115. These devices illustratively correspond to computing devices that facilitate configuration of the block storage servers 105, object storage servers 110, or other aspects of the system. For example, the control plane devices 115 in accordance with embodiments of the present disclosure may obtain and handle requests to create a new encrypted volume from a data source (e.g., a snapshot), including selection of an encryption mechanism based on computational load of the block store servers 105.

Figure 1B:
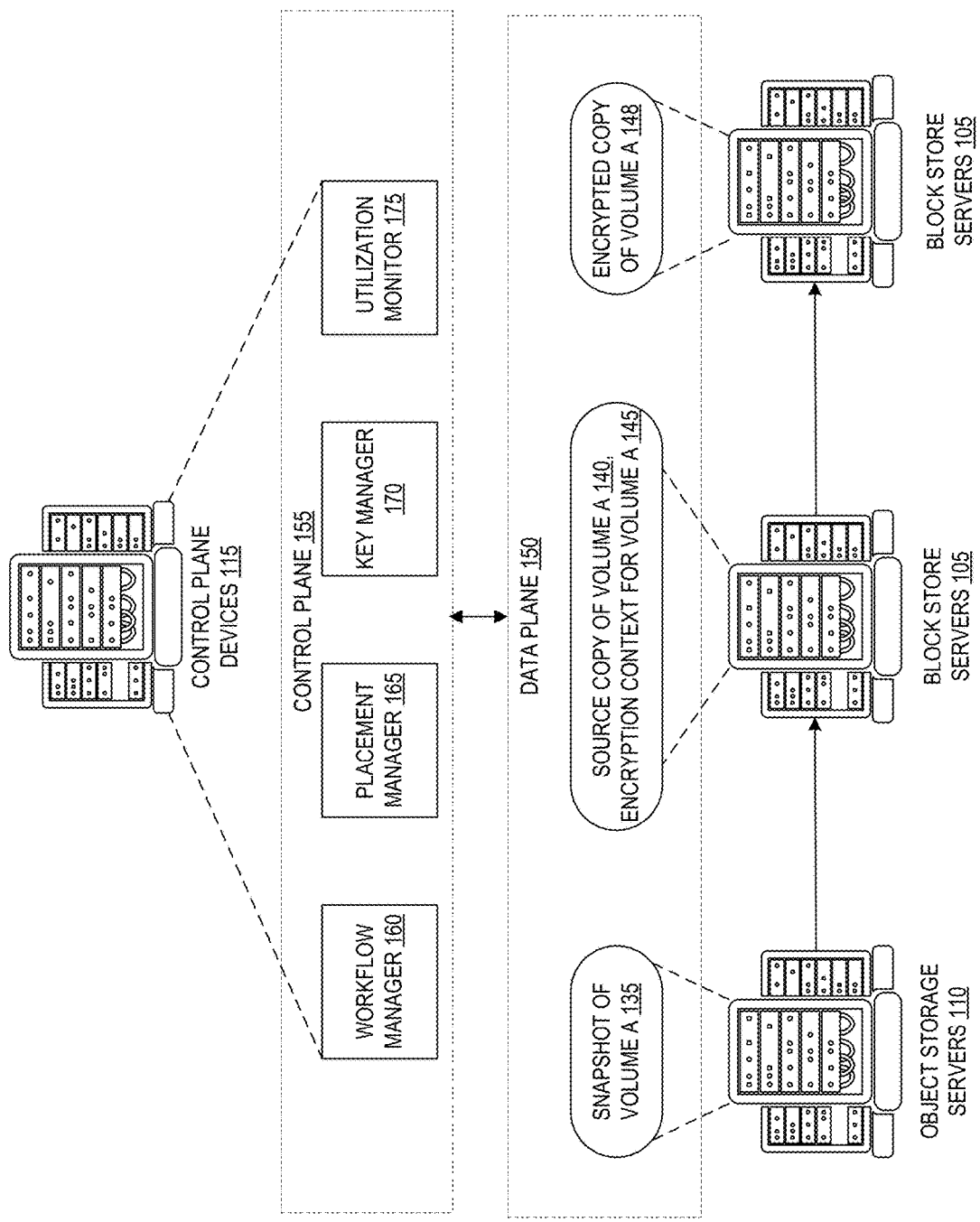
FIG. 1B depicts a schematic diagram of replicated data instances for creating encrypted volumes based on a load-dependent encryption selection within the elastic computing system of FIG. 1A, according to the present disclosure.

Further detail regarding the control plane devices 115 is provided with respect to FIG. 1B, which depicts a logical division of operation of the system 120 into a control plane 155 and data plane 150. Generally described, the logical "data plane" 150 represents the movement of user data through a distributed computing system, while the logical "control plane" 155 represents the movement of control signals through such a distributed computing system. For example, in FIG. 1B, the data plane 150 represents movement of data between a snapshot 135 of a given volume ("volume A") stored on the object storage servers 110, a copy of volume A 140 and encryption "context" 145 (e.g., information supporting encryption of the data of volume A) stored on one or more first block store servers 105, and an encrypted copy of volume A 148 stored on one or more other block store servers 105. Note that while the intermediary block store servers 105 are depicted in FIG. 1B as storing a copy of volume A, these servers 105 may be configured not to store an entire copy of the volume at any given time. Rather, data of the volume may be encrypted on the intermediary servers 105 "in flight," such that the data is removed shortly after being transmitted to the other block store servers 105 for storage in the encrypted copy 148. While one example of data plane 150 movement is shown in FIG. 1B, other examples exist. Illustratively, the data plane 150 can also facilitate user I/O to volumes 106. Data plane traffic can generally include other non-administrative operations.

The logical "control plane" 155 of the system 120, as shown in FIG. 1B, generally includes one or more control plane components distributed across and implemented by the control plane devices 115 to facilitate operation of the data plane 150. Control plane traffic generally includes administrative operations, such as system configuration and management (e.g., resource placement, hardware capacity management, diagnostic monitoring, system state information). In accordance with the present disclosure, the control plane devices 115 implement a number of components to implement load-dependent encryption mechanisms selection within the system 120, including a workflow manager 160, placement manager 165, key manager 170, and utilization monitor 175, each of which may represent code executing on a control plane device 115 to implement corresponding functionality.

Generally described, the workflow manager 160 can operate to orchestrate requests to create encrypted volumes 106 by interacting and coordinating with other elements of the control plane 155.

The placement manager 165 can operate to select a block store server 105 as a "target" server for the volume 106, such that the target server hosts the encrypted volume. In accordance with embodiments of the present disclosure, the placement manager 165 can further select an encryption mechanism for the volume based on load of the target server and potentially other servers, and based on a hierarchy of desirability for encryption mechanisms. The placement manager 165 may further select an encryption server from among block store servers 105 to support encryption of data for the volume, which (as applicable to the selected encryption mechanism) may be the same or different from the target server.

The key manager 170 may operate to generate and store encryption information for an encrypted volume, such as an encryption key used to encrypt data on the volume. For example, the key manager 315 can generate an encryption key based on master key or "customer master key" (CMK), and then can allow authorized entities to obtain the encryption key. The key manager 315 illustratively manages assigning key-value pairs and grants for the encryption process. A key-value pair refers to a key identifier for an encrypted key, and serves as a validation mechanism for entities within the elastic computing system 120 trying to access the key. For example, a key-value pair of {"key name":"encryption by default key" } could be used to name the encryption key, and this name can be recorded when the key is used in order to track its usage. A grant is a token that enables a particular identity within the elastic computing system 120 to use a master key or CMK, or to gain access to the plaintext content of a key.

The utilization monitor 175 can operate to monitor utilization of resources on the block store servers 105 (and potentially other servers, such as the object storage servers 110). Such resources include, but are not limited to, storage resources (e.g., availability of bytes on various physical storage devices) and computational resources (e.g., time, cycles, or percentage availability of processors). As discussed above, in some instances block store servers 105 may include isolated resources, including isolated processors, and thus the utilization monitor 175 may monitor both resources on isolated resources and other resources of block store servers 105.

As discussed in more detail below, the above-noted components of the control plane 155 may interact to facilitate secure encryption of data on the system 120, and thus to facilitate movement of data within the data plane 150 as shown in FIG. 1B.

Overview of Example Load-Dependent Encryption Selection Process

Figure 2:
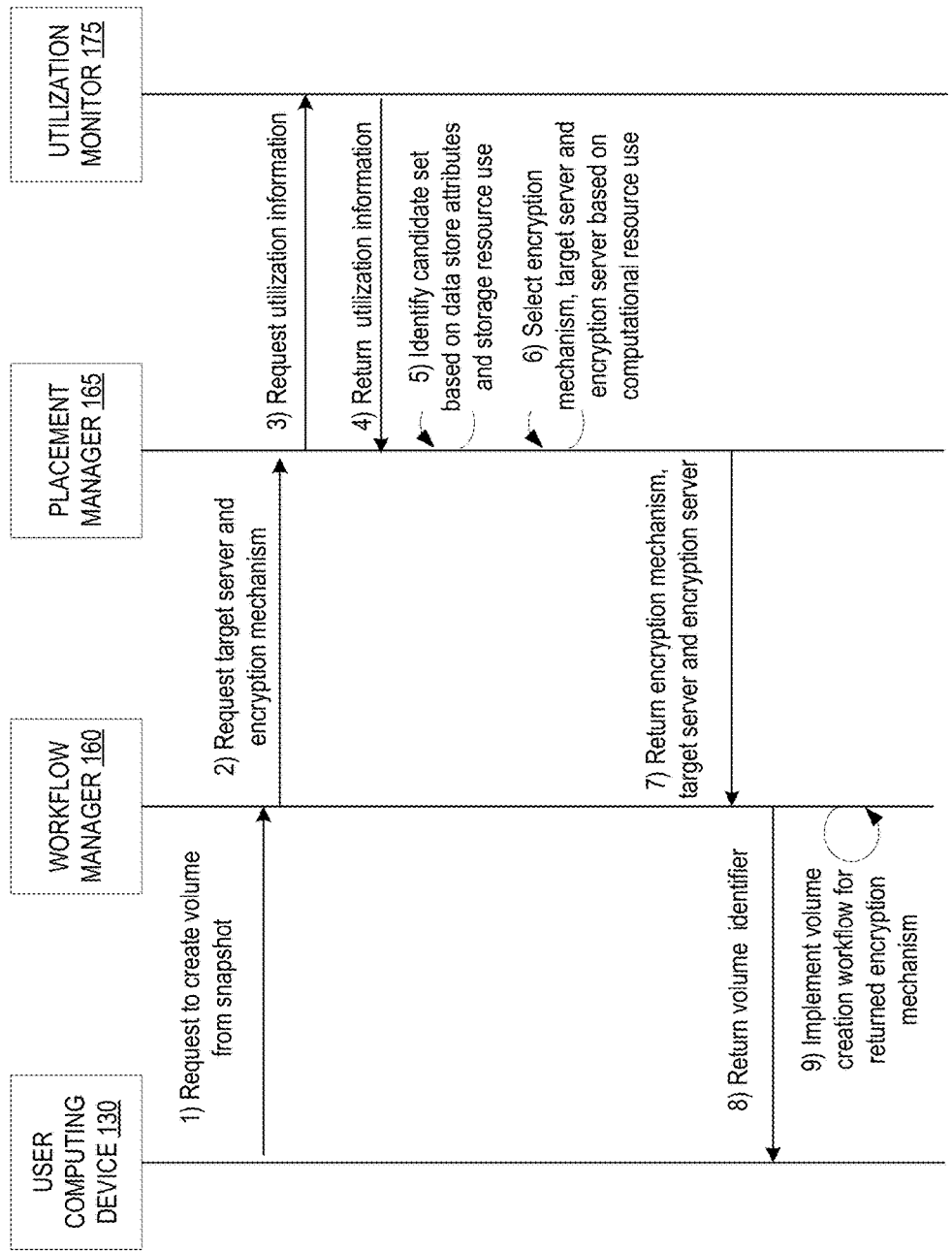
FIG. 2 depicts a schematic diagram of a workflow for load-dependent selection of an encryption mechanism when creating an encrypted volume within the elastic computing system of FIG. 1A.

With respect to FIG. 2, example interactions will be described for implementing load-dependent encryption selection. The interactions begin at (1), where a user computing device 130 submits to the elastic compute system 120 (e.g., through an application programming interface, or API) a request to create an encrypted virtualized block store from a data source—specifically, a snapshot on the object storage servers 110. The illustrative request specifies attributes of the block store, such as a size and desired performance metrics. The request further specifies encryption parameters, such as a key or key type, encryption algorithm, etc.

The elastic compute system 120 can thereafter act to create a virtualized block store (a "volume") on a host device (e.g., a block store server 105) having the desired attributes and containing the data of the data source encrypted according to the encryption parameters. The request is thus received at the workflow manager 160, which can facilitate creation and hydration of the volume.

As discussed above, to facilitate secure encryption, the encryption process implemented during population (or "hydration") of the volume from the data source is preferably isolated from user I/O to the volume. Moreover, while hydration of a volume requires both storage resources (to host the volume) and computational resources (to conduct encryption), requirements for these resources are preferably decoupled, such that the some block store server 105 is not required to have available both resources, thus increasing efficiency of resource use on the system. To address these requirements, the elastic compute system therefore includes a placement manager 165 configure to select a target server (e.g., a block store server 105) to host the volume, as well as an encryption mechanism that both isolates hydration encryption from user I/O and that can utilize computational resources independent of storage resources of the target server. The workflow manager 160 therefore, at (2), transmits a request to a placement manager 165 to select a target server and encryption mechanism.

To facilitate selection of a target server and encryption, the placement manager 165, at (3), requests utilization information from the utilization monitor 175. The utilization information can include, for example, storage resources available on block store servers 105 (e.g., storage available on varying types of physical storage devices, utilization of such devices, such as TOPS supported, etc.) and computational resources available on the servers 105 (e.g., processor usage, memory usage, etc., including usage of both isolated and non-isolated resources). The requested utilization information is then returned at (4).

At (5), the placement manager 165 identifies, based on the utilization information, a candidate set of block store servers 105 to potentially host the new volume. The candidate set is illustratively identified based on the requested attributes of the block store (e.g., size and performance requirements) and on the storage resources available on the block store servers 105. For example, the candidate set may include all or some subset (such as a top n) of block store servers 105 with available storage resources to host the volume given the requested attributes.

Thereafter, at (6), the placement manager 165 selects an encryption mechanism to use to hydrate the volume, based on the computational resource use (or correspondingly, availability) of block store servers 105. In one embodiment, the placement manager 165 is configured with a hierarchy of encryption mechanisms, ordered according to desirability. For example, the hierarchy may indicate that encryption on isolated resources of the target server is most preferred, encryption on isolated resources of a block store server 105 other than the target server is less preferred, and encryption on non-isolated resources of a block store server 105 is correspondingly less preferred. The placement manager 165 may thus select an encryption mechanism from the hierarchy according to the computational resource use of the block store servers 105.

More specifically, if a block store server 105 of the candidate set (e.g., one that has storage resources to host the volume) also has computational resources available within isolated resources to conduct encryption of data during hydration of the volume, then the placement manager 165 may select that server 105 as both the target and encryption server. In that instance, an "in-place" encryption mechanism is utilized, whereby encryption of source data occurs on the same block store server 105 hosting the device, thus minimizing network traffic within the system 120.

If no block store server 105 of the candidate set also has computational resources available within isolated resources to conduct the encryption, the placement manager 165 can nevertheless identify a server 105 from within the candidate set as the target server. The placement manager 165 can also identify a block store server 105 (e.g., outside of the candidate set) with sufficient computational resources available within isolated resources to conduct the encryption as the encryption server. In that instance, a remote encryption mechanism is utilized, whereby encryption of source data occurs on a different block store server 105 than the server 105 hosting the device. While remote encryption may increase network traffic on the system 120, it can also decouple computational and storage resources, increasing efficiency of the system 120.

If no block store server 105 has computational resources available within isolated resources to conduct the encryption, the placement manager 165 can identify a block store server 105, other than the target server, with sufficient computational resources available within non-isolated resources to conduct the encryption as the encryption server. If no block store server 105 has computational resources available within either isolated or non-isolated resources to conduct the encryption, the placement manager 165 can return an error to the workflow manager 160, which can in turn be returned to the user computing device 130. This instance also utilizes remote encryption, though without use of isolated resources. While use of isolated resources may generally be preferably, a mechanism using non-isolated resources may still be preferably to incurring errors in volume creation.

As discussed above, resources of block store servers 105 (both isolated and non-isolated) may implement a variety of tasks, some of which may be time-sensitive. Thus, when assessing availability of computational resources, the placement manager 165 may be configured with thresholds indicating a maximum usable level of resources (or, correspondingly, a minimum available level of resources) acceptable to use those resources for encryption. For example, the placement manager 165 may be configured such that no more than n % of resources of isolated resources (e.g., 90%) should be utilized on a block store server 105. In one embodiment, each encryption process may be expected to consume a relatively static amount of resources, and thus the thresholds may also be set statically. Thus, if a block store server 105 is utilizing less than n % of computational resources of its isolated resources, the placement manager 165 may select the server 105 as an encryption server. In another embodiment, the resources utilized during an encryption process may vary (e.g., according to the encryption parameters, speed of encryption, etc.). The placement manager 165 may therefore be configured to estimate resources utilized during encryption (e.g., based on historical data regarding encryption processes), and to vary a selection threshold for a server 105 based on that estimated resource usage. Thus, if a server 105 should use no more than n % of computational resources at any given time, and the estimated resource usage of the encryption is m % percentage of those resources, the placement manager 165 may be configured to select the server only if current resource usage plus the m % resource usage does not exceed n %. While embodiments are discussed herein with respect to percentage of resources, absolute thresholds may additionally or alternatively be used (e.g., at least n milliseconds per second available CPU time, etc.). In one embodiment, thresholds for a server 105 may vary based on the parameters of the volume requested. For example, a maximum level of use thresholds may be set lower for a relatively low performance volume, and higher for a relatively high performance volume. In this manner, additional resources can be reserved for some volume types (e.g., high performance volumes), such that they are more likely to utilize more preferred encryption mechanisms (e.g., in-place encryption).

After selecting the encryption mechanism, target server, and encryption server, the placement manager 165, at (7), returns the information identifying the encryption mechanism, target server and encryption server to the workflow manager 160. The workflow manager 160, in turn and at (8), returns to the user computing device 130 an identifier for the volume. In addition, at (9), the workflow manager 160 implements a volume creation workflow corresponding to the selected encryption mechanism. While workflows may vary according to the specific mechanism selected, the workflow may generally include causing the target server to create the volume and to hydrate the volume from the encryption server, while also causing the encryption server to retrieve data for the volume from a data source (e.g., a snapshot), to encrypt that data, and to provide the data to the target server.

Figure 3:
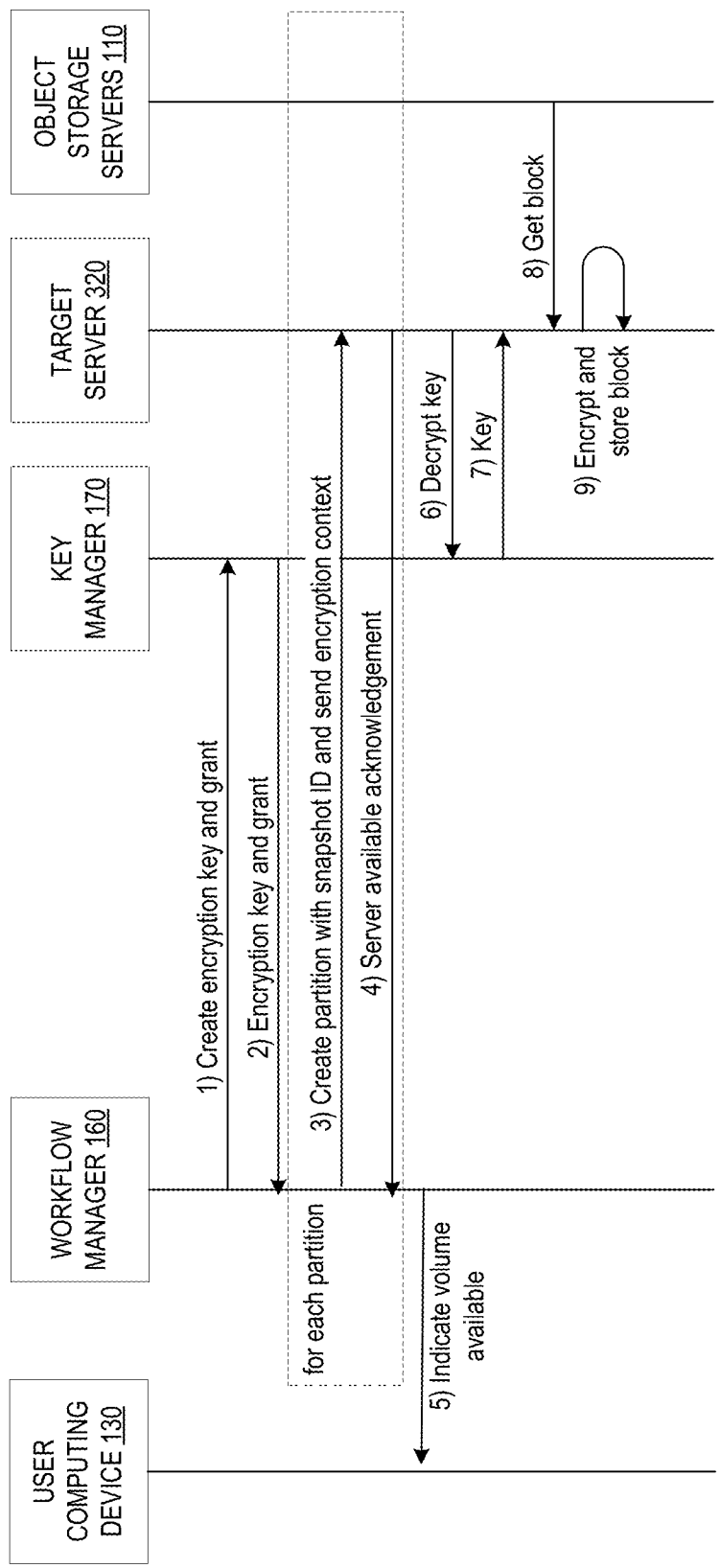
FIG. 3 depicts a schematic diagram of a workflow for implementing in-place encryption when creating the encrypted volume of FIG. 2.
Figure 4:
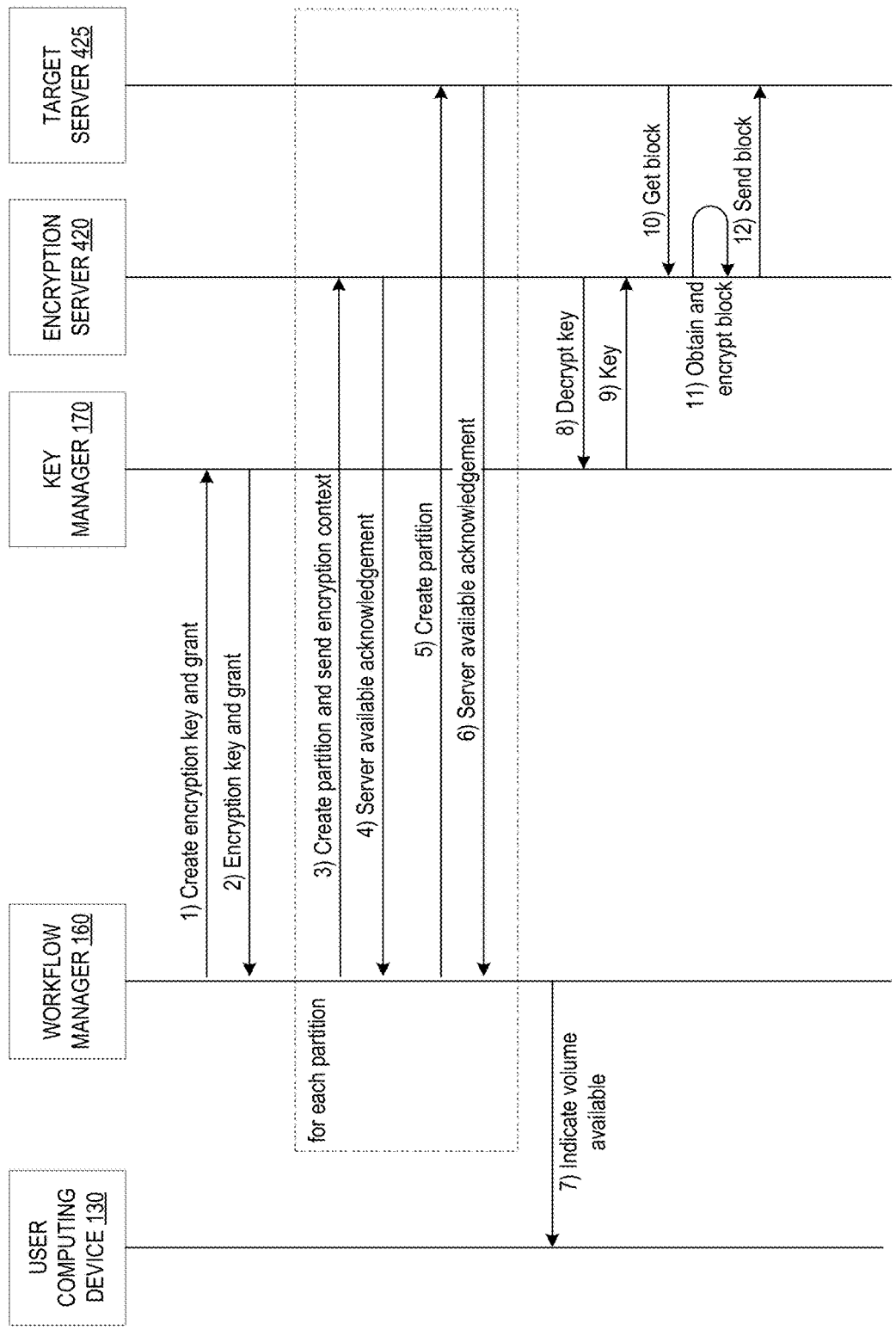
FIG. 4 depicts a schematic diagram of a workflow for implementing remote encryption when creating the encrypted volume of FIG. 2.

Specific workflows for creating volumes according to a selected encryption mechanisms will be described with respect to FIGS. 3 and 4. Specifically, FIG. 3 depicts a workflow for creating a volume utilizing "in-place" encryption, where isolated resources of a target server conducts encryption during hydration. As such, in this example, the target server can also be considered the encryption server. Additionally, FIG. 4 depicts a workflow for creating volumes using remote encryption, where a separate block server 105 conducts encryption during hydration (using, e.g., isolated or non-isolated resources).

The interactions of FIG. 3 begin at (1), where the workflow manager 160 sends a request to the key manager 170 to create an encryption key and grant for encrypting the new volume. Initially, the encryption key may be encrypted for heightened data security. A grant enables decryption of the encryption key, and specifically enables the workflow manager 160 programmatically delegate the use of encryption keys from the key manager 170 to other components of the elastic computing system 120, for example isolated resources on the target server 320. Typically, a grant expires after one use. Accordingly, at (2) the key manager 170 returns an encrypted encryption key and grant to the workflow manage 160.

As illustrated by the dashed box labeled "for each partition," interactions (3) and (4) are performed for each partition of the volume, iteratively or in parallel. As described above, volumes may be partitioned a number of times, for example up to 16. At (3), the workflow manager 160 creates the partition on one of the target server 320. While a single target server 320 is discussed herein, the partitions may be distributed among multiple target servers 320 (which may be selected by the placement manager 165 in accordance with the interactions discussed above). The creation command illustratively includes an identifier of the source data set for the partition (e.g., a snapshot), and thus corresponds to an instruction to populate the partition with data from the source data set. In addition, at (3), the workflow manager 160 transmits to the target server 320 the encryption context for the volume (e.g., the key used to encrypt the volume). To provide security, the encryption context may be transmitted to isolated resources of the target server 320, which may also implement control plane functionality of the server 320. At (3), the target server 320 sends a server available acknowledgement back to the workflow manager 160 to indicate that it has successfully stored the encryption context and created the requested partition.

On successful creation of the partitions, the workflow manager 160 can return to the user computing device 130 an indication that the volume is available. In this context, availability can indicate that the target server 320 is configured to accept user I/O to the volume. Notably, availability does not necessarily indicate that the volume has been populated with data from a source data set; however, in some configurations the target server 320 is configured to implement "get fault" handling, such that when a user requests data not yet populated from the source data set, that data is retrieved in response to the request. Thus, from the viewpoint of the user computing device 130, the volume can appear fully functional (albeit at potentially reduced operational speed).

In addition, at interactions (6-9), the target server 320 begins to populate the volume from the source data set; specifically, a snapshot on the object storage servers 110. Specifically, at (6), the target server 320 passes the encrypted key for the volume to the key manager 170, which may decrypt the key after authenticating the target server 320 and return the encryption key at (7). The target server 320 can then, at (8), obtain a block of data for the volume from the object storage servers 110, encrypt the block according to the encryption key, and store the block on the target server 320. In some cases, such as where the data is encrypted on the servers 110 via a different key, encryption of the block may also include decryption of the data obtained from the servers 110. As discussed above, the above-noted interactions may occur on isolated resources such that the encryption process is secure from malicious user interaction. Interactions (8) and (9) may repeat for each block of the volume, until hydration of the volume is completed. Thus, the user may be provided with an encrypted volume containing data from the specified data source.

With respect to FIG. 4, a workflow will be described for creating volumes using remote encryption, where a separate block server 105 conducts encryption during hydration (using, e.g., isolated or non-isolated resources). The interactions of FIG. 4 begin at (1), where the workflow manager 160 to the key manager 315 to create an encryption key and grant for encrypting the source volume, which returns the key and grant at (2). Interactions (1) and (2) of FIG. 4 are similar to corresponding interactions of FIG. 3, and thus will not be re-described.

As illustrated by the dashed box labeled "for each partition," interactions (3) through (6) are performed for each partition of the volume, iteratively or in parallel. These interactions are somewhat similar to interactions (3) and (4) of FIG. 3, but unlike in FIG. 3, the creation and acknowledgement occurs both with respect to an encryption server 420 and target server 425. (While a single encryption server 420 and target server 425 are shown in FIG. 4, multiple such servers, such as one per-partition, may be selected during the interactions of FIG. 2). Specifically, at (3), the workflow manager 160 creates each partition on the encryption server 420, while providing encryption context for the volume to the encryption server 420. The workflow manager 160 can further indicate to the encryption server 420 a data source for the volume, such as a snapshot. The server 420, in turn, can acknowledge creation of each partition, at (4). Similarly, at (5), the workflow manager 160 creates each partition on the target server 425. However, because remote encryption is utilized, the target server 425 is not provided with encryption context for the volume (and thus can be expected not to have sufficient information to decrypt data on the volume). The workflow manager 160 can further indicate to the target server 425 that the encryption server 420 represents a data source for the volume.

On successful creation of the partitions, the workflow manager 160 can return to the user computing device 130 an indication that the volume is available. In this context, availability can indicate that the target server 425 is configured to accept user I/O to the volume. As noted above, availability does not necessarily indicate that the volume has been populated with data from a source data set; however, in some configurations the target server 425 is configured to implement "get fault" handling, such that when a user requests data not yet populated from the source data set, that data is retrieved in response to the request. Thus, from the viewpoint of the user computing device 130, the volume can appear fully functional (albeit at potentially reduced operational speed).

In some instances, "get fault" handling may utilize the same encryption mechanism selected for initial hydration of a volume. For example, the target server 320 may handle get faults by retrieving, in response to a request, data from the encryption server 420, which may similarly implement get fault handling to retrieve the data from the data source, encrypt the data, and provide the data to the server 320. In other instances, get fault handling may utilize a different encryption mechanism than that selected for initial hydration. For example, the target server 320 may handle get faults by utilizing isolated resources of the target server 320 to retrieve the requested data from a data source, encrypt the data, and store the data on the volume.

In addition, at interactions (8-12), the target server 425 and encryption server 420 begin to populate the volume from the source data set. Specifically, at (8), the encryption server 420 passes the encrypted key for the volume to the key manager 170, which may decrypt the key after authenticating the encryption server 420 and return the encryption key at (9). Thereafter, the target server 425 can begin to request blocks of data from the encryption server 420. For each requested block, the encryption server 420 can obtain the block from the data source (e.g., the object storage servers 110) and encrypt the block, at (11). The encryption server 420 can then return the block to the target server 425. Interactions (10) through (12) may repeat for each block of the volume, until hydration of the volume is completed. Thus, the user may be provided with an encrypted volume containing data from the specified data source.

Figure 5:
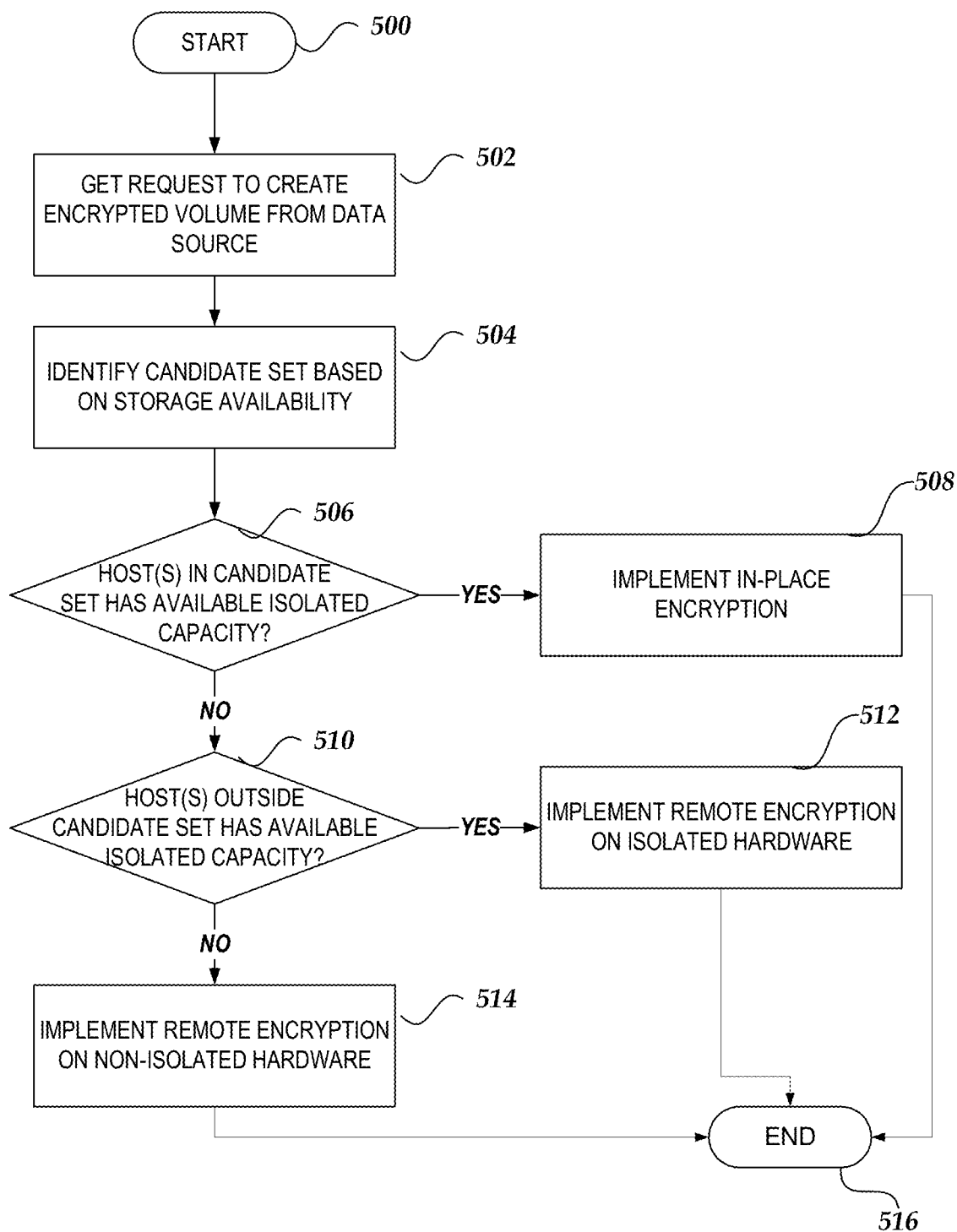
FIG. 5 is a flowchart of an example process for load-dependent selection of an encryption mechanism when creating an encrypted volume.

With reference to FIG. 5, an example routine 500 will be described for load-dependent selection of an encryption mechanism when creating an encrypted volume. The routine 500 may be implemented, for example, by control plane devices 115 of an elastic compute system 120 (e.g., via implementation of a placement manager 165, workflow manager 160, utilization monitor 175, etc.).

The routine 500 begins at block 502, where the control plane devices 115 obtain a request to create an encrypted volume from a data source, such as a snapshot. The request illustratively specifies parameters of the volume, such as size, performance metrics, and encryption parameters, as well as the data source (e.g., a specific snapshot). The data source may be unencrypted, or may be encrypted according to different encryption parameters, such as a different key, different encryption mechanism, different encryption strength, etc.

At block 504, the control plane devices 115 identify a candidate set, including host devices of the elastic compute system 120 with available storage to host the volume. The candidate set is illustratively selected based on storage resources (e.g., data stores) of the host devices, such as an available capacity of the data stores and performance characteristics of the data stores. For example, where the request specifies that the volume should have a certain number of gigabytes and a specific performance level (e.g., IOPS), the control plane devices 115 can identify host devices that can provide that number of gigabytes and performance level. In some embodiments, each host device within the set may be individually capable of hosting the volume. In another embodiment, each device within the set may be capable of hosting a portion of the volume (e.g., a partition), such that multiple devices within the candidate set could collectively host the volume.

At block 506, the control plane devices 115 determine whether one or more host devices within the candidate set have available isolated computational resources (e.g., processor cycles, memory capacity, etc., on isolated resources) to encrypt data from the data set during population of the volume. As discussed above, the control plane devices 115 may illustratively determine an estimated amount of resources required to conduct encryption (e.g., based on a statically configured amount or amount estimated from historical data regarding encryption), and compare that amount to an amount of available resources on isolated resources. In some instances, a portion of resources of isolated resources may be reserved for other uses, such as handling encryption during "get faults" or handling control plane operations. Thus, "available resources" may refer to non-reserved, unused resources on isolated resources. In one embodiment, reserved resources may be implemented by configuring a maximum threshold usage value for a host device expected to be reached during encryption of data for a volume. For example, the control plane devices 115 may be configured to ensure that in-place encryption of a volume is estimated to result in no more than n % of computational resource use on isolated resources of a host device. In instances where the volume will be placed on a single host device, the control plane devices 115 can determine whether any single host device of the candidate set has available isolated computational resources to support encryption. In instances where the volume will be placed on multiple host devices, the control plane devices 115 can determine whether any collection of host device of the candidate set has collective available isolated computational resources to support encryption. Illustratively, where a volume is divided into n partitions, the control plane devices 115 can determine whether n host devices of the candidate set each have available isolated computational resources to support encryption of a single partition of the volume.

Where host devices within the candidate set have sufficient available isolated computational resources to implement encryption, the routine 500 proceeds to block 508, where the control plane devices 115 implement in-place encryption during population of the volume from a data set. For example, the control plane devices 115 may select one or more host devices of the candidate set as target devices to host the volume, and instruct those target devices to create the volume and populate respective portions of the volume with the data set, while utilizing their respective isolated resources to encrypt data of the data set prior to storage within the volume. Block 508 may be implemented similarly to the interactions of FIG. 3, described above.

Where host devices within the candidate set do not have sufficient available isolated computational resources to implement encryption, the routine 500 proceeds to block 510, where the control plane devices 115 determine whether hosts outside the candidate set have sufficient available isolated computational resources to implement encryption. Block 510 may be implemented similarly to block 506, described above, but with respect to host devices outside of the candidate set. Where host devices outside of the candidate set have sufficient available isolated computational resources to implement encryption, the routine 500 proceeds to block 512, where the control plane devices 115 implement remote encryption during population of the volume from a data set, utilizing isolated resources of host devices outside of the candidate set. For example, the control plane devices 115 may select one or more host devices of the candidate set as target devices to host the volume, and instruct those target devices to create the volume and populate respective portions of the volume with encrypted data from one or more encryption servers. The control plane devices 115 may further select one or more host devices outside of the candidate set as those encryption servers, and instruct such devices to utilizing their respective isolated resources to encrypt data of the data set prior to providing that data to the target devices. In one embodiment, the number of encryption servers can match the number of target devices, and each encryption server may support encryption for data of a corresponding target device. For example, the number of encryption servers and target devices may equal the number of partitions on a volume. In other embodiments, the number of encryption servers may be more or less than the number of target devices. Block 512 may be implemented similarly to the interactions of FIG. 4, described above.

Where host devices outside of the candidate set do not have sufficient available isolated computational resources to implement encryption, the routine 500 proceeds to block 514, where the control plane devices 115 implement remote encryption of data from the data set using non-isolated computational resources on one or more host devices outside of the candidate set. Block 514 may be implemented similarly to block 512, except that encryption can occur on non-isolated resources of the encryption servers. As discussed above, while use of isolated computational resources may be preferred, use of non-isolated resources may provide sufficient security during encryption, and may thus be preferable over rejecting the request to create a volume.

After implementing one or blocks 508, 512, or 514, thus creating a volume and utilizing the encryption mechanism selected based on computational resource load among host devices, the routine 500 ends at block 516.

Example Computer System

Figure 6:
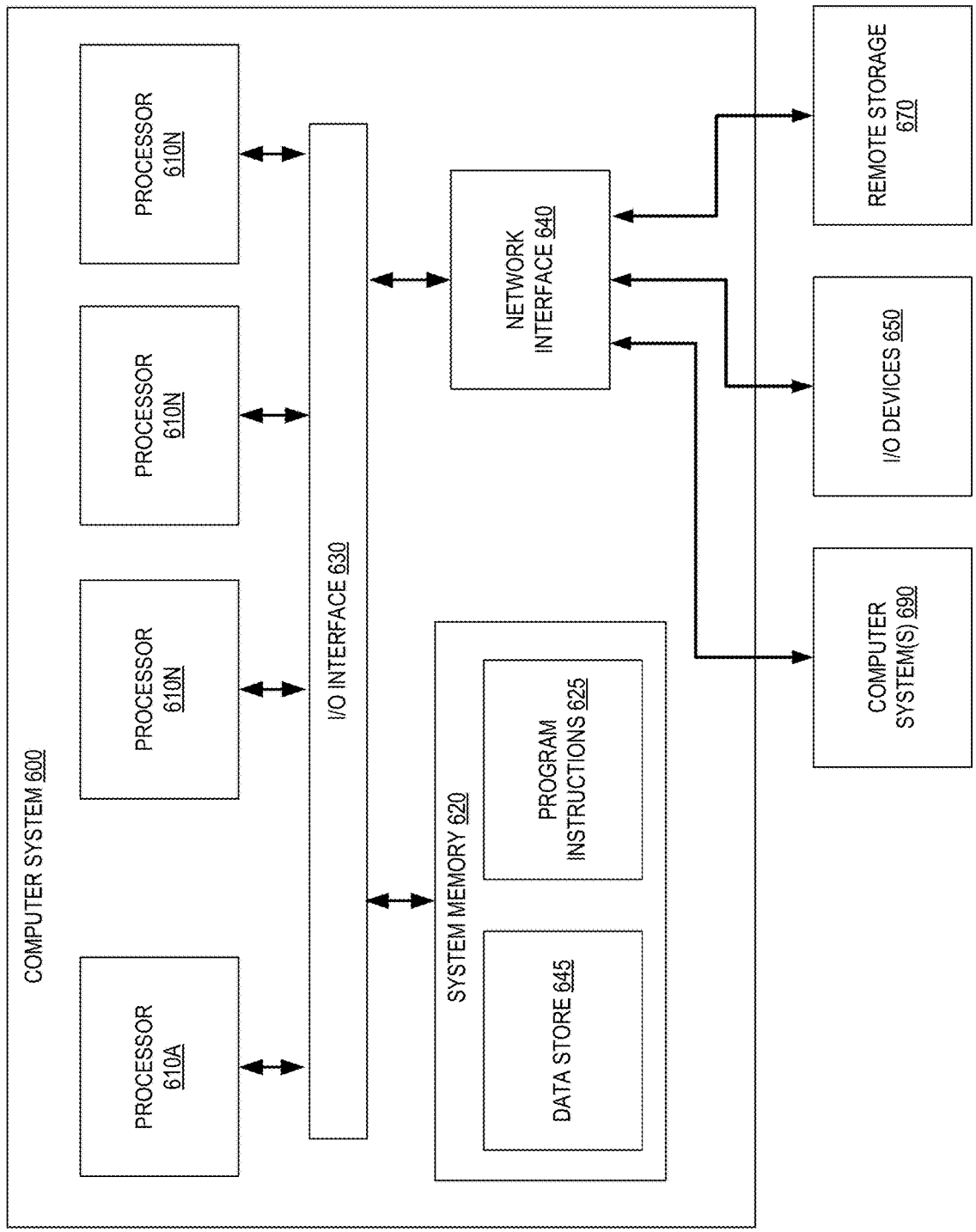
FIG. 6 depicts a schematic diagram of an example computing system.

FIG. 6 is a block diagram illustrating an example computer system, according to various embodiments. For example, instances of the computer system 600 may be used to implement object storage servers 110, block store servers 105, or control plane devices 115 in the elastic computing system 120. Computer system 600 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 600 includes one or more processors 610 (any of which may include multiple cores, which may be single or multi-threaded) coupled to a system memory 620 via an input/output (I/O) interface 630. Computer system 600 further includes a network interface 640 coupled to I/O interface 630. In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA. The computer system 600 also includes one or more network communication devices (e.g., network interface 640) for communicating with other systems and/or components over a communications network (e.g. Internet, LAN, etc.).

In the illustrated embodiment, computer system 600 also includes one or more persistent storage devices 660 and/or one or more I/O devices 680. In various embodiments, persistent storage devices 660 may correspond to disk drives, tape drives, solid state memory, other mass storage devices, block-based storage devices, or any other persistent storage device. Computer system 600 (or a distributed application or operating system operating thereon) may store instructions and/or data in persistent storage devices 660, as desired, and may retrieve the stored instruction and/or data as needed. For example, in some embodiments, computer system 600 may act as a worker, and persistent storage 660 may include the SSDs attached to that worker to facilitate storage of write journal entries.

Computer system 600 includes one or more system memories 620 that are configured to store instructions and data accessible by processor(s) 610. In various embodiments, system memories 620 may be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 620 may contain program instructions 625 that are executable by processor(s) 610 to implement the routines, interactions, and techniques described herein. In various embodiments, program instructions 625 may be encoded in platform native binary, any interpreted language such as Java byte-code, or in any other language such as C/C++, Java, etc., or in any combination thereof. For example, in the illustrated embodiment, program instructions 625 may include program instructions executable to implement the functionality of a block store server 105. In some embodiments, program instructions 625 may implement one or more of the workflow manager 160, placement manager 165, key manager 170, or utilization monitor 175.

In some embodiments, program instructions 625 may include instructions executable to implement an operating system (not shown), which may be any of various operating systems, such as UNIX, LINUX, Solaris, MacOS, Windows, etc. Any or all of program instructions 625 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 640.

In some embodiments, system memory 620 may include data store 645. In general, system memory 620 (e.g., data store 645 within system memory 620), persistent storage 660, and/or remote storage 670 may store write journal entries, data blocks, replicas of data blocks, metadata associated with data blocks and/or their state, configuration information, and/or any other information usable in implementing the methods and techniques described herein.

In one embodiment, I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computer system 600 and other devices attached to a network, such as other computer systems 690, for example. In addition, network interface 640 may be configured to allow communication between computer system 600 and various I/O devices 650 and/or remote storage 670 (which may represent, for example, data stores 64). Input/output devices 650 may, in some embodiments, include one or more display terminals, keyboards, keypads, touchpads, scanning devices, voice or optical recognition devices, or any other devices suitable for entering or retrieving data by one or more computer systems 600. Multiple input/output devices 650 may be present in computer system 600 or may be distributed on various nodes of a distributed system that includes computer system 600. In some embodiments, similar input/output devices may be separate from computer system 600 and may interact with one or more nodes of a distributed system that includes computer system 600 through a wired or wireless connection, such as over network interface 640. Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol. In various embodiments, computer system 600 may include more, fewer, or different components than those illustrated in FIG. 6 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes 210, 255 may begin in response to an event, such as on a predetermined or dynamically determined schedule, on demand when initiated by a user or system administer, or in response to some other event. When the process 210, 255 is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process 210, 255 or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A block storage system comprising:
   a plurality of storage host computing devices, each storage host computing device configured to host virtualized storage devices on behalf of client computing devices, each storage host computing device comprising:
   a data store configured to store data of the virtualized storage devices;

first hardware configured to support client input/output (I/O) to the virtualized storage devices; and
second hardware isolated from client I/O to the virtualized storage devices and configured to support encryption of data written to the virtualized storage devices; and
one or more computing devices configured to:
obtain a request to generate a virtualized storage device on the block storage system based on a source data set, wherein the request specifies that the source data set is to be encrypted prior to storage within the virtualized storage device;
identify a subset of storage host computing devices from the plurality of storage host computing devices as a candidate set for the virtualized storage device, wherein the subset of storage host computing devices is identified based at least partly on requested attributes of the virtualized storage device and on data stores of individual storage host computing devices of the subset;
determine the storage host computing devices of the subset, identified based at least partly on the requested attributes of the virtualized storage device and on the data stores of individual storage host computing devices of the subset, do not have sufficient available isolated computational resources to support encryption of the source data set, wherein the available isolated computational resources reflect an availability of the second hardware, isolated from client I/O to the virtualized storage devices, of respective storage host computing devices of the subset; and
responsive to determining that the storage host computing devices of the subset, identified based at least partly on the requested attributes of the virtualized storage device and on the data stores of individual storage host computing devices of the subset, do not have sufficient available isolated computational resources to support encryption of the source data set:
select at least one first storage host computing device from the subset to host the virtualized storage device;
select at least one second storage host computing device, from the plurality of storage host computing devices, that is not of the subset and with sufficient available computational resources to support encryption of the source data set;
instruct the at least one first storage host computing device to populate the virtualized storage device from the second storage host computing device; and
instruct the at least one second storage host computing device to obtain data from the source data set, encrypt the data, and provide the data to the at least one first storage host computing device to populate the virtualized storage device.

2. The system of claim 1, wherein the subset of storage host computing devices is identified based at least partly on an available capacity of data stores of the individual storage host computing devices and on performance metrics of the data stores.

3. The system of claim 1, wherein the one or more computing devices are configured to determine the storage host computing devices of the subset do not have sufficient available isolated computational resources to support encryption of the source data set based at least partly on determining that usage of the second hardware on at least one storage host computing devices of the subset exceeds a threshold amount.

4. The system of claim 1, wherein the one or more computing devices instruct the at least one second storage host computing device to utilize, to encrypt the data of the source data set, hardware on the at least one second storage host computing device that is isolated from client I/O to virtualized storage devices hosted by the at least one second storage host computing device.

5. A computer-implemented method comprising:
obtaining a request to generate a virtualized storage device on a block storage system based on a source data set, wherein the request specifies that the source data set is to be encrypted prior to storage within the virtualized storage device;
identifying a subset of storage host computing devices on the block storage system as a candidate set for the virtualized storage device, wherein the subset of storage host computing devices is identified based at least partly on requested attributes of the virtualized storage device and on data stores of individual storage host computing devices of the subset;
determining the storage host computing devices of the subset, identified based at least partly on the requested attributes of the virtualized storage device and on the data stores of individual storage host computing devices of the subset, do not have sufficient available isolated computational resources to support encryption of the source data set, wherein the available isolated computational resources reflect an availability of resources on the storage host computing devices of the subset that are isolated from client input/output (I/O) to virtualized storage devices hosted by the storage host computing devices of the subset; and
responsive to determining that the storage host computing devices of the subset, identified based at least partly on the requested attributes of the virtualized storage device and on the data stores of individual storage host computing devices of the subset, do not have sufficient available isolated computational resources to support encryption of the source data set:
selecting at least one first storage host computing device from the subset to host the virtualized storage device;
selecting at least one second storage host computing device that is not of the subset and with sufficient available computational resources to support encryption of the source data set; and
instructing the at least one second storage host computing device to obtain data from the source data set, encrypt the data, and provide the data to the at least one first storage host computing device to populate the virtualized storage device.

6. The computer-implemented method of claim 5, wherein the virtualized storage device is divided into multiple partitions, and wherein the at least one first storage host computing device corresponds to multiple first storage host computing devices, each of the multiple storage host computing devices hosting at least one of the multiple partitions.

7. The computer-implemented method of claim 6, wherein the at least one second storage host computing device corresponds to multiple second storage host computing devices, and wherein an individual second storage host computing device supports encryption of data provided to a corresponding first storage host computing device.

8. The computer-implemented method of claim 5 further comprising instructing the at least one first storage host computing device to populate the virtualized storage device from the at least one second storage host computing device.

9. The computer-implemented method of claim 5 further comprising:
   receiving, at the at least one first storage host computing device, a request for first data on the virtualized storage device not yet populated to the virtualized storage device from the source data set;
   transmitting, from the at the at least one first storage host computing device to the at least one second storage host computing device, a request for the first data;
   at the at least one second storage host computing device and responsive to the transmitted request for the first data:
      obtaining the first data from the source data set;
      encrypting the first data; and
      providing the first data in encrypted form to the at the at least one first storage host computing device; and
   providing the first data in encrypted form from the at least one first storage host computing device to a requesting device.

10. The computer-implemented method of claim 5 further comprising, at the at least one first storage host computing device:
   receiving a request for first data on the virtualized storage device not yet populated to the virtualized storage device from the source data set;
   utilizing the available isolated computational resources of the at least one first storage host computing device to obtain the first data from the source data and encrypt the first data; and
   providing the first data in encrypted form from the at least one first storage host computing device to a requesting device.

11. The computer-implemented method of claim 5, wherein instructing the at least one second storage host computing device comprises instructing the at least one second storage host computing device to utilize, to encrypt the data of the source data set, resources on the at least one second storage host computing device that is isolated from client I/O to virtualized storage devices hosted by the at least one second storage host computing device.

12. The computer-implemented method of claim 5, wherein the request to generate the virtualized storage device specifies encryption parameters for encryption of the source data set.

13. The computer-implemented method of claim 12, wherein the encryption parameters specify a key to be used to encrypt the source data set.

14. The computer-implemented method of claim 5, wherein determining the storage host computing devices of the subset do not have sufficient available isolated computational resources to support encryption of the source data set comprises determining that usage of isolated resources on at least one storage host computing devices of the subset exceeds a threshold amount.

15. The computer-implemented method of claim 14, wherein the threshold amount is determined based at least partly on an estimated resource use during encryption of data from the source data set.

16. Non-transitory computer-readable media comprising instructions executable on one or more computing devices of a block storage system to:
   identify a subset of storage host computing devices on the block storage system as a candidate set for hosting a virtualized storage device populated based on a source data set, wherein the subset of storage host computing devices is identified based at least partly on requested attributes of the virtualized storage device and on data stores of individual storage host computing devices of the subset;
   determine the storage host computing devices of the subset, identified based at least partly on the requested attributes of the virtualized storage device and on the data stores of individual storage host computing devices of the subset, do not have sufficient available isolated computational resources to support encryption of the source data set, wherein the available isolated computational resources reflect an availability of resources on the storage host computing devices of the subset that are isolated from client input/output (I/O) to virtualized storage devices hosted by the storage host computing devices of the subset; and
   responsive to determining that the storage host computing devices of the subset, identified based at least partly on the requested attributes of the virtualized storage device and on the data stores of individual storage host computing devices of the subset, do not have sufficient available isolated computational resources to support encryption of the source data set:
      select at least one second storage host computing device that is not of the subset and with sufficient available computational resources to support encryption of the source data set; and
      instruct the at least one second storage host computing device to obtain data from the source data set, encrypt the data, and provide the data to at least one first storage host computing device select selected from the subset to host the virtualized storage device.

17. The non-transitory computer-readable media of claim 16, wherein
   instructing the at least one second storage host computing device comprises the instructing the at least one second storage host computing device to utilize, to encrypt the data of the source data set, resources on the at least one second storage host computing device that is isolated from client I/O to virtualized storage devices hosted by the at least one second storage host computing device.

18. The non-transitory computer-readable media of claim 16, wherein:
   the instructions are further executable by the one or more computing devices to determine that storage host computing devices of outside of the subset do not have sufficient available isolated computational resources to support encryption of the source data set; and
   instructing the at least one second storage host computing device comprises the instructing the at least one second storage host computing device to utilize, to encrypt the data of the source data set, resources on the at least one second storage host computing device that is not isolated from client I/O to virtualized storage devices hosted by the at least one second storage host computing device.

19. The non-transitory computer-readable media of claim 16, wherein the subset of storage host computing devices is identified based at least partly on an available capacity of data stores of the individual storage host computing devices and on performance metrics of the data stores.

20. The non-transitory computer-readable media of claim 16, wherein determining the storage host computing devices of the subset do not have sufficient available isolated computational resources to support encryption of the source data set comprises determining that usage of isolated resources on at least one storage host computing devices of the subset exceeds a threshold amount.

21. The non-transitory computer-readable media of claim 20, wherein the threshold amount is determined based at least partly on an estimated resource use during encryption of data from the source data set.

\* \* \* \* \*

UNITED STATES PATENT AND TRADEMARK OFFICE
CERTIFICATE OF CORRECTION

PATENT NO.       : 11,503,081 B1
APPLICATION NO.  : 16/786868
DATED            : November 15, 2022
INVENTOR(S)      : Venugopal et al.

It is certified that error appears in the above-identified patent and that said Letters Patent is hereby corrected as shown below:

In the Specification

Column 2, Line 43, delete "others 13 for" and insert -- others—for --.

In the Claims

Column 27, Line 11, Claim 9, delete "transmitting, from the at the at least one" and insert -- transmitting, from the at least one --.

Column 28, Line 33, Claim 16, delete "select selected" and insert -- selected --.

Signed and Sealed this
Fourteenth Day of March, 2023

Katherine Kelly Vidal
*Director of the United States Patent and Trademark Office*